UNITED STATES PATENT OFFICE.

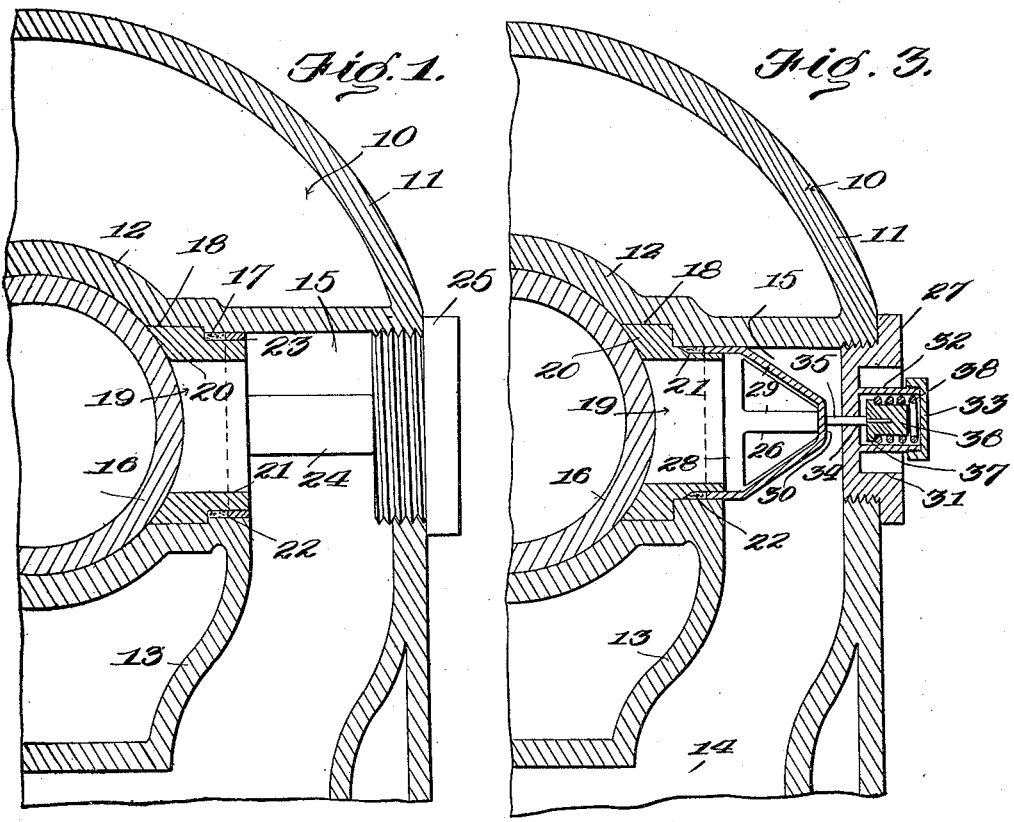
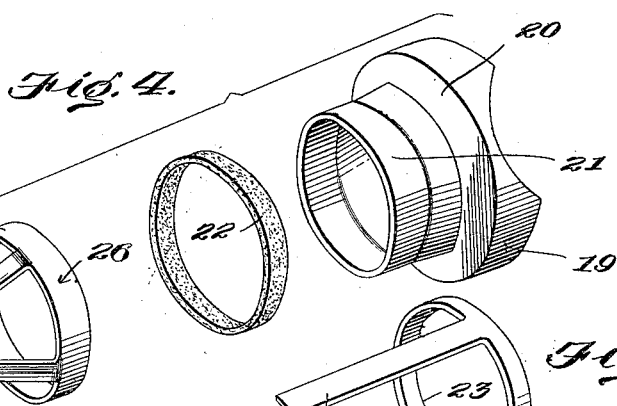
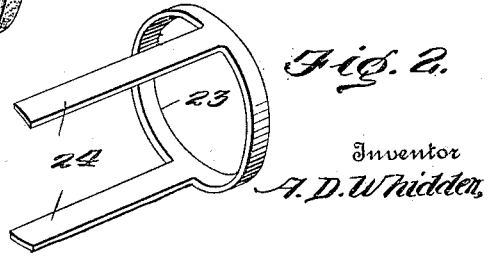

ARTHUR D. WHIDDEN, OF ELYRIA, OHIO.

PACKING-RING.

1,139,004.  Specification of Letters Patent.  Patented May 11, 1915.

Application filed February 12, 1914. Serial No. 818,368.

*To all whom it may concern:*

Be it known that I, ARTHUR D. WHIDDEN, citizen of the United States, residing at Elyria, in the county of Lorain and State of Ohio, have invented certain new and useful Improvements in Packing-Rings, of which the following is a specification.

My invention relates to new and useful improvements in packing rings for valves, the primary object of my invention being the provision of a packing ring for use with rotary valves for internal combustion engines.

A further object of my invention is the provision of a packing ring proper, preferably formed of metal and shaped at its inner end to engage snugly against the cylindrical face of the valve.

A still further object of my invention is the provision of an auxiliary packing ring of asbestos, mineral wool or other suitable material co-acting with the first named packing ring to prevent outward leakage of gases, an adjustable follower or clamping ring being provided for holding the two rings in proper position with respect to each other and to the surface of the valve. And a still further object of my invention is to provide a follower or clamping member which may be spring pressed to provide for and take up wear of the packing rings to insure close fitting engagement of the packing ring against the valve at all times.

With these and other objects in view my invention will be more fully described, illustrated in the accompanying drawing, and then specifically pointed out in the claims which are attached to and form a part of this application.

In the drawing:—Figure 1 is a fragmentary transverse sectional view taken through a rotary valve and its casing and through one of my improved packing rings applied thereto; Fig. 2 is a perspective view of the follower or clamping ring removed from the valve structure; Fig. 3 is a view similar to Fig. 1 illustrating a slightly modified form of packing ring and follower construction; Fig. 4 is an unassembled perspective view of the packing ring members shown in Fig. 3.

Corresponding and like parts are referred to in the following description and indicated in all the views of the drawing by the same reference characters.

The packing ring forming the subject matter of my present invention is intended primarily for use with rotary gas engine valves of the type disclosed in my copending application, filed June 10, 1913, and bearing the Serial No. 772,849. For this reason I have illustrated the packing ring in connection with a gas engine having a valve casing 10 including inner and outer walls 11 and 12 forming an intermediate water jacketing through which extend ducts 13 leading from the cylinder 14 to the valve and ducts 15 permitting access to the packing ring and in some instances, serving as intake or exhaust passages from the valve. The inner wall 12 of the casing is cylindrical in cross section to snugly receive the hollow cylindrical valve 16 which, of course, is provided with ports, not shown, adapted to register in certain positions with the leads of the ducts 13 and 15.

The inner face of the inner wall 12 of the valve casing about each port 17 is provided with an annular seat 18 to receive the packing ring proper 19. This packing ring proper, as best shown in Fig. 4 of the drawing, includes a body portion 20 preferably annular in shape and having its inner face shaped to conform with and bear against the peripheral face of the valve, as clearly shown in Figs. 1, 3 and 4 of the drawing. Although the seat and packing ring, thus far described, as shown, are annular, it will of course be understood that they may be made in any desired shape, the shape generally varying according to the shape of the port in the valve 16 with which the ring is to co-act. The outer face of the packing ring is provided with an outwardly directed annular flange 21 which extends in parallel spaced relation to the wall of the duct 15 to provide space for an auxiliary packing ring 22 of asbestos, mineral wool or other suitable material.

A clamping ring 23 is inserted to bear against the packing ring 22 to force the latter into close engagement with the packing ring 19, its flange 21 and the wall of the duct 15. This clamping ring is provided with two or more spaced apart legs 24 which extend longitudinally of the duct 15 and against which the inner edge of a clamp screw 25, threaded into the outer end of the duct 15, bears.

If the port for which the packing ring structure above described is provided, is a port communicating with a duct 13 leading to the cylinder, this clamp screw 25 will be constructed in the form of a solid plug or cap closing the outer end of the duct 15. On the other hand, if the port is an inlet or exhaust port between the valve and the intake or exhaust manifold of the engine, that is, if there is no duct 13 leading to such port, the clamp screw 25 will be in the form of a ring coupling connecting the manifold lead with the valve casing 11. In either event, the clamp screw 25 may be readily adjusted to apply the proper amount of pressure to the clamp ring 23 to suitably expand the fiber packing ring 22.

In Figs. 3 and 4 of the drawing, I have illustrated a slightly modified form of packing ring, the sole difference consisting in the construction of the clamping ring, there indicated as a whole by the numeral 26 and of the clamping screw, there indicated as a whole by the numeral 27. In this form of my invention, the clamping ring 26 includes an annular body member or follower 28 provided at its outer edge with spaced converging legs 29 connected at their free ends to a common foot or bearing plate 30. The clamp screw 27 preferably has its outer face recessed as at 31 and is provided with an annular flange 32 threaded at its outer end to receive a cap 33. Further, the clamp screw is perforated centrally of the flange 32 as shown at 34 to receive a clamping pin 35, one end of which bears against the foot 30 of the clamping ring and the other end of which carries a cylindrical head 36 provided at its inner end with a circumferential flange 37 to seat the inner end of a helical spring 38, the outer end of which bears against the cap 33. With this form of clamp screw, it will be apparent that the spring 38 will exert a constant pressure against the head 36 of the pin 35 causing the latter to bear firmly against the clamping ring 26 to hold the same in firm and constant engagement with the fiber packing ring 22.

The foregoing description, taken in connection with the drawing, clearly discloses the application and operation of my improved clamping ring and any further description is therefore deemed unnecessary.

It will of course be understood that minor changes, within the scope of the appended claims, may be made at any time, without in the slightest degree departing from the spirit of my invention.

Having thus described the invention, what is claimed as new is:

1. In a packing ring construction, the combination with a valve casing inclosing a rotary cylindrical valve and having a duct leading through the casing to the valve, of a packing ring including an annular body member positioned in a seat formed in the inner face of the valve casing about the inner end of the duct and having its inner end shaped to conform to the outer face of the valve, an outwardly directed flange formed upon the ring, an asbestos packing ring seating between said flange and the wall of the duct, a clamping ring engaging against the asbestos ring and provided with converging legs, a foot carried by the legs, and a clamp screw threaded in the outer end of the duct and operatively engaging the foot to force the clamping ring inwardly.

2. In a packing ring construction, the combination with a valve casing inclosing a rotary cylindrical valve and having a duct leading through the casing to the valve, of a packing ring including an annular body member positioned in a seat formed in the inner face of the valve casing about the inner end of the duct and having its inner end shaped to conform to the outer face of the valve, an outwardly directed flange formed upon the ring, an asbestos packing ring seating between said flange and the wall of the duct, a clamping ring engaging against the asbestos ring and provided with converging legs, a foot carried by the legs, and a clamp screw threaded in the outer end of the duct and operatively engaging the foot to force the clamping ring inwardly, said clamp screw including a pin engaging the foot, and a spring holding the pin in such engagement.

3. In a packing ring construction, the combination with a valve casing inclosing a rotary cylindrical valve and having a duct leading through the casing to the valve, of a packing ring including an annular body member positioned in a seat formed in the inner face of the valve casing about the inner end of the duct and having its inner end shaped to conform to the outer face of the valve, an outwardly directed flange formed upon the ring, an asbestos packing ring seating between said flange and the wall of the duct, a clamping ring engaging against the asbestos ring and provided with converging legs, a foot carried by the legs, and a clamp screw threaded in the outer end of the duct and operatively engaging the foot to force the clamping ring inwardly, said clamping screw including a body perforated centrally and provided with a circumferential outwardly directed flange, a pin extending through the perforation of the body to engage the foot of the clamping ring, a flanged head carried by the pin and seating within the flange, a cap threaded upon the free end of the flange, and a spring bearing between the flange of the head and the cap.

In testimony whereof I affix my signature in presence of two witnesses.

ARTHUR D. WHIDDEN. [L. S.]

Witnesses:
 FRANK WILFORD,
 LINDA KRAUSE.